US010200605B2

(12) United States Patent
Yuan (10) Patent No.: US 10,200,605 B2
(45) Date of Patent: Feb. 5, 2019

(54) SYSTEMS AND METHODS FOR VIDEO COMPRESSIVE SENSING USING A ROTATING MASK

(71) Applicant: Alcatel-Lucent USA Inc., Murray Hill, NJ (US)

(72) Inventor: Xin Yuan, Summit, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 23 days.

(21) Appl. No.: 15/333,611

(22) Filed: Oct. 25, 2016

(65) Prior Publication Data

US 2018/0115703 A1    Apr. 26, 2018

(51) Int. Cl.
| | |
|---|---|
| *G03B 15/00* | (2006.01) |
| *G03B 29/00* | (2006.01) |
| *G03B 39/00* | (2006.01) |
| *H04N 5/225* | (2006.01) |
| *H04N 5/232* | (2006.01) |

(52) U.S. Cl.
CPC ......... *H04N 5/23232* (2013.01); *G03B 15/00* (2013.01); *G03B 29/00* (2013.01); *H04N 5/2254* (2013.01); *G03B 39/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,606,165 | A * | 2/1997 | Chiou | G01T 1/167 250/363.06 |
| 6,304,293 | B1 * | 10/2001 | Kubota | H04N 5/23212 348/229.1 |
| 2004/0238741 | A1 * | 12/2004 | Gat | H04N 5/238 250/338.1 |
| 2008/0118181 | A1 * | 5/2008 | Potuluri | G01J 3/02 382/275 |
| 2010/0003024 | A1 * | 1/2010 | Agrawal | H04N 5/2254 396/340 |
| 2011/0181757 | A1 * | 7/2011 | Fish | H04N 5/2254 348/239 |
| 2014/0267818 | A1 * | 9/2014 | Perlman | H04N 5/2254 348/222.1 |
| 2015/0201143 | A1 * | 7/2015 | Ono | H04N 5/2254 348/302 |

OTHER PUBLICATIONS

P. Llull, X. Liao, X. Yuan, J. Yang, D. Kittle, L. Carin, G. Sapiro, and D. J. Brady, "Coded aperture compressive temporal imaging," Optics Express, pp. 698-706, 2013.
D. Reddy, A. Veeraraghavan, and R. Chellappa, "P2C2: Programmable pixel compressive camera for high speed imaging," IEEE Computer Vision and Pattern Recognition (CVPR), 2011.

(Continued)

*Primary Examiner* — Jason A Flohre
(74) *Attorney, Agent, or Firm* — Harness, Dickey & Pierce, P.L.C.

(57) ABSTRACT

In an example embodiment, a motion capturing device includes a mask configured to rotate during capture of a scene by the motion capturing device and modulate the scene; and a motor coupled to the mask and configured to rotate the mask during the capturing of the scene.

19 Claims, 3 Drawing Sheets

(56) References Cited

OTHER PUBLICATIONS

Y. Hitomi, J. Gu, M. Gupta, T. Mitsunaga, and S. K. Nayar, "Video from a single coded exposure photograph using a learned overcomplete dictionary," in IEEE International Conference on Computer Vision (ICCV), 2011.
C. L. L. Gao, J. Liang and L. V. Wang, "Single-shot compressed ultrafast photography at one hundred billion frames per second," Nature, vol. 516, pp. 74-77, 2014.
X. Yuan, P. Llull, X. Liao, J. Yang, G. Sapiro, D. J. Brady, and L. Carin, "Low-cost compressive sensing for color video and depth," in IEEE Conference on Computer Vision and Pattern Recognition (CVPR), 2014.
J. Yang, X. Yuan, X. Liao, P. Llull, G. Sapiro, D. J. Brady, and L. Carin, "Video compressive sensing using Gaussian mixture models," IEEE Transaction on Image Processing, vol. 23, No. 11, pp. 4863-4878, Nov. 2014.
J. Bioucas-Dias and M. Figueiredo, "A new TwIST: Two-step iterative shrinkage/thresholding algorithms for image restoration," IEEE Transactions on Image Processing, vol. 16, No. 12, pp. 2992-3004, Dec. 2007.
X. Yuan, "Generalized alternating projection based total variation minimization for compressive sensing," in International Conference on Image Processing (ICIP), 2016.

\* cited by examiner

SYSTEMS AND METHODS FOR VIDEO COMPRESSIVE SENSING USING A ROTATING MASK

BACKGROUND

Capturing a high speed video including fast motion typically requires the use of high speed motion cameras that utilize expensive charge-coupled devices (CCDs) or complimentary metal-oxide-semiconductor (CMOS) transistors that are capable of capturing thousands of frames per second (fps). However, such cameras are costly and have a limited capturing time window (e.g., a few minutes or hours).

As an alternative to using high speed motion cameras, various video compressive sensing (VCS) cameras have been introduced. Such VCS cameras enable reconstruction of high speed videos (e.g., equal to or greater than 400 fps) using an actual capturing of such videos at a low frame rate (e.g., 30 fps).

The available VCS cameras capture a video at a low frame rate by modulating the actual high speed video with a fast moving mask (e.g. a mask that shifts vertically or horizontally) or a dynamic mode decomposition (DMD) arrays. Thereafter, the VCS cameras utilize known reconstruction algorithms to recover the high speed video from a single coded (modulated) capture of the video using the low frame rate.

Similar to the high speed motion cameras, the VCS cameras are also expensive due to high speed coding implemented via a precise piezo translation or DMD arrays used therein.

SUMMARY

One or more example embodiments may enable a more simplified reconstruction of high speed motion picture (e.g., a video) captured at a low frame rate by using a rotating mask instead of the fast moving mask or the DMD arrays in combination with the precise piezo translation, as described in the background section together.

In an example embodiment, a motion capturing device includes a mask configured to rotate during capture of a scene by the motion capturing device and modulate the scene; and a motor coupled to the mask and configured to rotate the mask during the capturing of the scene.

In yet another example embodiment, the motor is configured to rotate the mask such that the mask completes one revolution every time a frame of the scene is captured by the motion capturing device.

In yet another example embodiment, the motor is configured to rotate the mask for a number of times every time a frame of the scene is captured by the motion capturing device, each time the motor is configured to rotate the mask for a fixed degree of rotation.

In yet another example embodiment, the fixed degree of rotation is based on a number of high speed frames of the scene to be reconstructed from the modulated scene.

In yet another example embodiment, the fixed degree of rotation is given by 360 degrees divided by the number of high speed frames.

In yet another example embodiment, the scene is a high speed motion scene, and the motion capturing device is configured to capture the scene at a rate of frames per unit of time that is lower relative to the high speed motion of the scene.

In yet another example embodiment, the mask is coded with a random pattern.

In yet another example embodiment, the random pattern is a binary pattern that either allows for a transmission of light or a blocking thereof.

In yet another example embodiment, the random pattern is a grayscale pattern according to which light is transmitted in proportion to a local transmittance ratio of the mask.

In yet another example embodiment, the rotation of the mask is an angular rotation about a central axis passing through components of the motion capturing device.

In yet another example embodiment, during the capture of the scene, the mask does not shift vertically or horizontally.

In yet another example embodiment, the motor is a vibrating motor.

In yet another example embodiment, the motion capturing device further includes a lens configured to project light on to the scene; a relay lens; and a charge-coupled device, wherein the mask is between the lens and the relay lens.

In yet another example embodiment, the motion capturing device further includes a lens configured to project light on to the scene; a relay lens; and a charge-coupled device, wherein the mask is between the relay lens and the charge-coupled device.

In yet another example embodiment, an electronic mobile device includes a display; and the motion capturing device of claim 1, the motion capturing device configured to be controlled via the display.

In an example embodiment, a device includes a memory having computer-readable instructions stored therein; and a processor. The processor is configured to execute the computer-readable instructions to control a motion capturing device to capture a scene, receive the captured scene, obtain a plurality of frames corresponding to the scene based on the captured scene and a plurality of filters, each of the plurality of filters corresponding to a rotated version of a mask in the motion capturing device, the mask being configured to rotate during the capturing of the scene, and reconstruct the scene based on the plurality of frames.

In yet another example embodiment, the scene is a high speed motion scene formed of the plurality of frames.

In yet another example embodiment, the motion capturing device is configured to capture the scene at a lower rate of frames per unit of time relative to the high speed motion of the scene.

In yet another example embodiment, the processor is configured to execute the computer-readable instructions to obtain each of the plurality of frames by transforming the received captured scene into a first vector of pixel values, and for each pixel value, determine a second vector of pixel values that minimizes a difference between the pixel value and a product of the second vector of pixel values and a corresponding one of the plurality of filters, the second vector of pixel values corresponding to one of the plurality of frames.

In yet another example embodiment, the product is an element-wise product of the second vector of pixel values and the corresponding one of the plurality of filters.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and 3$^{rd}$ Generation Partnership Project LTE (3GPP LTE).

Figure 1:
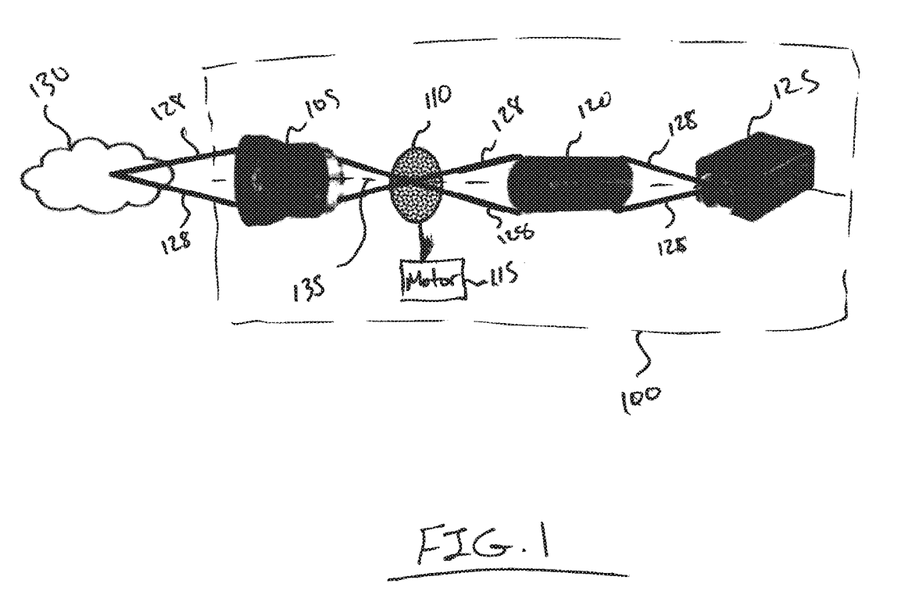
FIG. 1 illustrates a motion capturing device, according to an example embodiment.

FIG. 1 illustrates a motion capturing device, according to an example embodiment.

As shown in FIG. 1, the motion capturing device 100 includes an objective lens 105, a mask 110, a motor 115, a relay lens 120 and charge-coupled device (CCD) 125. The objective lens 105, the relay lens 120 and the CCD 125 may be any known or to be developed lens, relay lens and CCD used in cameras for directing, projecting and capturing light beams (rays) 128 off of a scene 130.

The motion capturing device 100 may be any known or to be developed camera capable of capturing the scene 130 at a given rate of frames per second (fps) (e.g., 30 fps). The scene 130 may be any scene involving a fast moving object, which if to be accurately captured, would require using high speed motion cameras capable of capturing hundreds or thousands of frames per second. Hereinafter, the scene 130 may also be referred to as a high speed motion scene 130.

The motion capturing device 100 may be utilized as a stand-alone device (e.g., a stand-alone camera) or may be incorporated into another device such as, but not limited to, a cellular phone, a laptop, a tablet, a desktop, a television set, a mobile camera, a car, a surveillance camera, a camera used in recording and broadcasting various types of media program such as a sporting event, a movie, etc.

In one example embodiment, the motor 115 is physically connected to the mask 110. The motor 115 may operate to rotate the mask 110 during a capturing of the scene 130 by the motion capturing device 100. The motor 115 may or may not be part of the motion capturing device 100 (e.g., the motor 115 may be physically separate from but connected to the motion capturing device 100). In one example embodiment, the motor 115 may be a vibrator motor (e.g., a vibrator motor of a cellular phone may also be used to rotate the mask 110 when the motion capturing device 100 is implemented in such cellular phone).

While in FIG. 1, the mask 110 is shown as positioned between the lens 105 and the relay lens 120, example embodiments are not limited thereto. For example, the mask 110 may be positioned between the relay lens 120 and the CCD 125 instead of being positioned between the objective lens 105 and the relay lens 120.

In one example embodiment, the mask 110 may formed of chrome or quartz. The mask 110 may be a binary mask formed of pixels, where each pixel either allows a light beam (e.g., the light beam 128) to pass (transmit) there through or blocks the light beam. Such a mask may also be referred to as a binary coded mask 110. In one example embodiment, the binary pattern of the mask 110 may be a random or pseudo random pattern of pixels (blocks) that either allow for passing (transmission) of light beams or block such light beams. In one example embodiment, the pattern may follow a specific rule (e.g., the pattern may be a Hadamard pattern).

In one example embodiment, the mask 110 may be a grayscale mask formed of pixels, where each pixel may have a transmittance ratio associated therewith. Accordingly, each pixel may allow a portion of light beams (depending on a transmittance ratio thereof) to pass through. For example, if a particular pixel has a transmittance ratio of "1", then the entire light beam may pass through. If a pixel has a transmittance ration of "0.6", then 60 percent of light beams incident thereon may pass through. If a pixel has a transmittance ratio of "0", then the entire light beam may be blocked and nothing will pass through said pixel. In one example embodiment, the transmittance ratio of each pixel is a design parameter that may be determined/modified based on empirical studies and/or experiments.

In one example embodiment, while the motion capturing device 100 performs the task of capturing the scene 130 (this may be referred to as a capturing period T), the motor 115 rotates the mask 110. In one example embodiment, the motor 115 rotates the mask 110 for a number of times during the capturing period.

In one example embodiment, at every instance of time during the capturing period T, the motor 115 rotates the mask a number of times and each time for a fixed degree (e.g., 30 degrees at a time, 45 degrees at a time, 60 degrees at a time, etc.). The degree of rotation is not limited to the given numerical examples and may be set to any value between 0 to 360 degrees depending on experiments, design choice and/or empirical studies (e.g., based on a number of high speed frames (denoted by P) to be reconstructed, as will be described below). In one example embodiment, the motor 115 may continuously rotate the mask 110 during the capturing period T.

In one example embodiment, the motion capturing device 100 is capturing the scene 130 during the capturing period T at a relatively low rate of fps (e.g., 30 fps). Accordingly, the motion capturing device 100 captures one frame every 33 ms (1 second divided by 30 frames to be captured each second). During the capturing of each frame every 33 ms, the mask 110 rotates 360 degrees (completes one revolution). Accordingly, each captured frame, every 33 ms, may be referred to as one coded (modulated) frame.

In one example embodiment and depending on a number of high speed frames P to be reconstructed from each coded frame, a degree of rotation of the mask 110 (and accordingly a number of times the mask 110 is rotated) is determined. For example, if 12 high speed frames are to be reconstructed (i.e., P=12) from each coded frame, then motor 115 rotates the mask 110, 12 times corresponding to the 12 high speed frames. Furthermore, the motor 115 rotates the mask 110 for 30 degrees (angular step) each of the twelve times in order to complete a 360 degree rotation during the capturing of each coded frame. In another example embodiment, if 36 high speed frames are to be reconstructed (e.g., P=36) from each coded frame, then the motor 115 rotates the mask 110, 36 times. Furthermore, the motor 115 rotates the mask 110 for 10 degrees (angular step) each of the 36 times in order to complete a 360 degree rotation during the capturing of each coded frame.

In one example embodiment, the motor 115 is calibrated, depending on the desired (and/or alternatively, predetermined) number of high speed frames to be reconstructed, to carry out the rotating of the mask 110 at appropriate angles (e.g., 30 degrees or 10 degrees as described above).

In one example embodiment, the rotation of the mask 110 may be clockwise or counter clockwise. In one example embodiment, the rotation of the mask 110 is an angular rotation about a central axis 135 passing through various components (i.e., the projective lens 105, the relay lens 120 and the CCD 125) of the image capturing device 100. In one example embodiment and during an angular rotation of the mask 110, the mask does not move vertically and/or horizontally.

In one example embodiment, each rotation of the mask 110 results in a different version of the pattern (e.g., binary or grayscale pattern described above) of the mask 110 modulating the correspondingly captured frame and thus results in a different modulation of the frame.

In the example embodiment given above and assuming a capturing period T of 5 seconds at a rate of 30 fps, the motion capturing device 100 would capture 150 frames at the end of the capturing period. The captured frames may then be added (integrated over the capturing period) to result in the scene 130 being captured (e.g., a 5 seconds long video of the scene 130 is captured). This may be referred to as one instance of motion capturing. In one example embodiment, the one instance of motion capturing based on the modulated frames may be referred to as a compressed version of the original high speed motion of the scene 130.

Thereafter and as will be described below, the compressed version of the scene 130 and the patterns of rotated versions of the mask 110 (known to a processor and represented by a matrix of values, as will be described below), will be used to reconstruct the original frames of the high speed motion of the scene 130 (the compressed version of the scene 130 is decompressed to reconstruct the original frames over the same capturing period T).

Figure 2:
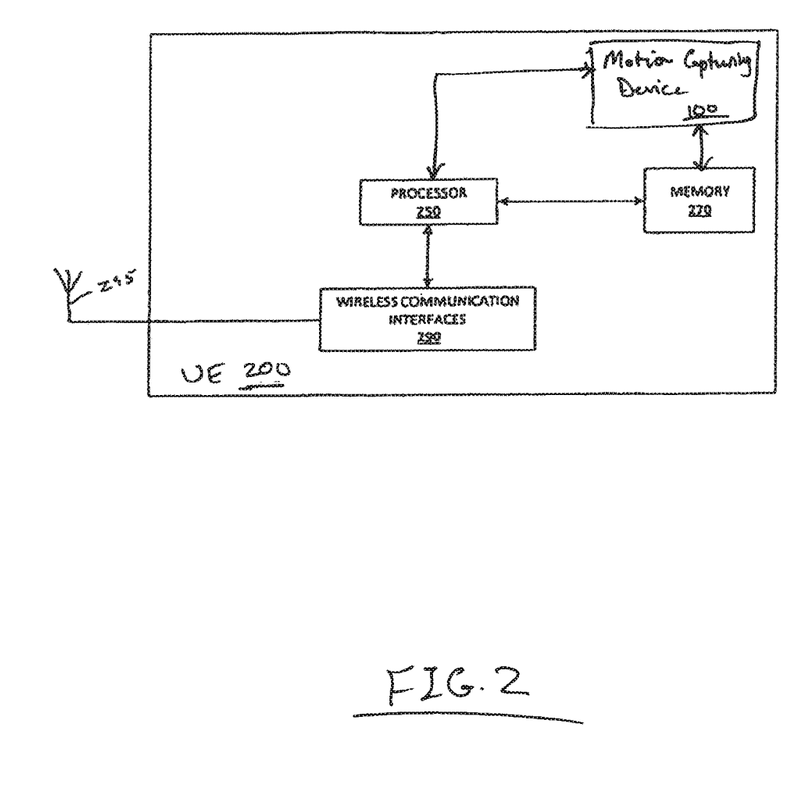
FIG. 2 illustrates an example of a device that reconstructs a scene, a compressed version of which is captured by the motion capturing device of FIG. 1, according to an example embodiment.

FIG. 2 illustrates an example of a device that reconstructs a scene, a compressed version of which is captured by the motion capturing device of FIG. 1, according to an example embodiment.

Referring to FIG. 2, a user equipment (UE) 200 includes: a memory 270; a processor (or processing circuit) 250 connected to the memory 270; various interfaces 290 connected to the processor 250; and an antenna 295 connected to the various interfaces 290. The UE 200 also includes the motion capturing device 100. The motion capturing device 100 is capable of communicating with the processor 250 and the memory 270.

The various interfaces 290 and the antenna 295 may constitute a transceiver for transmitting/receiving data from/to the UE 200. As will be appreciated, depending on the implementation, the UE 200 may include many more components than those shown in FIG. 2. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 200 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 200 will vary depending on the implementation of the UE 200.

In one example embodiment, the UE 200 may be any known or to be developed device including, but not limited to, a cellular phone, a laptop, a tablet, a personal computer, a portable media device such as a television set, a multi-functional camera, etc.

In one example embodiment, upon receiving a "start" command (e.g., a command from a user of the UE 200 via a screen of the UE 200), the processor 250 may transmit one or more commands to the motion capturing device 100 to start capturing the scene 130. The motion capturing device 100 may continuously capture the scene until a "stop" command is received from the processor 250 and/or until the maximum amount of time during which the motion capturing device 100 is capable of capturing a scene. Accordingly and in one example embodiment, the capturing period T described above is determined to span a period of time between the issuance of the "start" and "stop" commands.

In one example embodiment, upon receiving the start command, the motor 115 may initiate rotating the mask 110 at a desired (and/or alternatively, predetermined) angular speed (in order to implement a number of rotations at fixed angular steps to complete one revolution during a capture of each frame, as described above) while the motion capturing device 100 captures the high speed motion scene 130 at relatively low rate of frames per second (e.g., 30 fps). Upon completion of the capturing of the scene 130, the motion capturing device 100 transmits the captured scene to the processor 250.

As will be described below with reference to FIG. 3, the processor 250 reconstructs the high speed motion scene 130 based on the captured scene received from the motion capturing device 130 and the variations of the rotated mask 110 known to the processor 250. Thereafter and upon reconstructing the high speed motion scene 130, the processor 250 performs a post processing task on the reconstructed high speed motion scene 130. For example, the processor 250 may cause the reconstructed high speed motion scene 130 to be displayed on the display of the UE 200, the processor 250 may transmit the reconstructed high speed motion scene 130 to another device as requested, the processor 250 may provide the reconstructed high speed motion scene 130 to another application on the UE 200 for further customized processing, etc.

Figure 3:
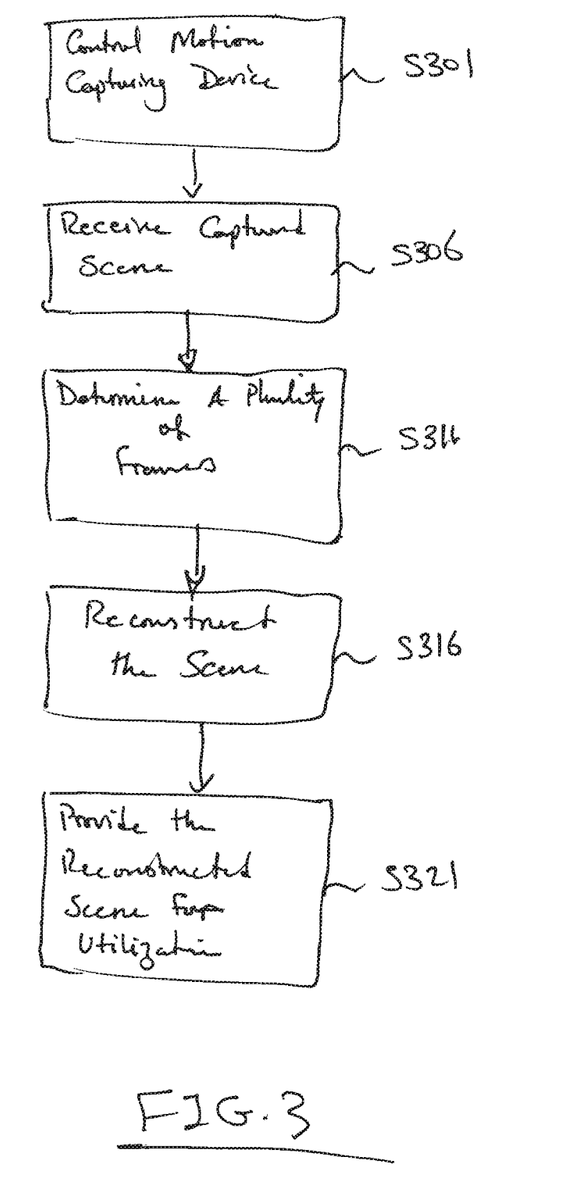
FIG. 3 illustrates a process of reconstructing a high speed motion scene from an instance of capturing the high speed motion scene at relatively low rate of frames per second, according to an example embodiment.

FIG. 3 illustrates a process of reconstructing a high speed motion scene from an instance of capturing the high speed motion scene at relatively low rate of frames per second, according to an example embodiment.

FIG. 3 will be described from the perspective of the processor 250 of the UE 200. Furthermore, in describing FIG. 3, it is assumed that the motion capturing device 100 is part of the UE 200. However, example embodiments are not limited thereto. For example, the motion capturing device 100 may be a stand-alone camera with an embedded processor and memory (similar to the memory 270 and the processor 250 described above with reference to FIG. 2) and a transceiver for reconstructing and post processing a high speed motion scene.

At S301, the processor 250 controls the motion capturing device 100 to capture the scene 130. In one example embodiment, the processor 250 controls the motion capturing device 100 by transmitting a command to "start" capturing the scene 130, as described above. In one example embodiment, the "start" command may be received via a display of the motion capturing device 100 (or the UE 200 which includes the motion capturing device 100). In one example embodiment and as part of the processing of controlling the motion capturing device 100, the processor 250 may transmit a "stop" command to stop the capturing of the scene 130, as described above. In one example embodiment, the "stop" command may be received via a display of the motion capturing device 100 (or the UE 200 which includes the motion capturing device 100). Accordingly, in one example embodiment, the motion capturing device 100 may be said to be controlled via a display of the UE 200 or a display of the motion capturing device 100.

Furthermore and as described above, the scene 130 is a high speed motion scene, an accurate and high quality capturing of which would require a high speed motion capturing device (camera) capable of capturing hundreds or thousands of frames per second. However, example embodiments described here would enable a reconstruction of the high speed motion scene via frames captured via a motion capturing device such as the motion capturing device 100 at relatively low rate of frames per second (e.g., 30 fps).

Upon receiving control commands from the processor 250, the motion capturing device 100 captures the scene 130 for duration of capturing period T. During the capturing period T and as described above, the motor 115 rotates the mask 110 for modulating and capturing a series of coded frames. The scene 130 as captured by the motion capturing device 100 may be referred to as the captured scene or the modulated scene.

While S306, S311, S316 and S321 will be described below for one capture of the scene 130 over a single capturing period T, example embodiments are not limited thereto. For example, at S301, the processor 250 may control the motion capturing device 100 to capture several different scenes for several capturing periods T. As such, the processor 250 may perform S306, S311, S316 and S321 for each captured scene during each of the several capturing periods T.

At S306 and upon completion of the capturing of the scene 130, the processor 250 receives the scene as captured.

At S311, the processor 250 determines a plurality of high speed frames of the high speed motion scene 130 based on the captured scene and variations of the mask 110. In one example embodiment, the number of high speed frames to be reconstructed corresponds to that based on which a degree of rotation of the mask 110 is determined (calibrated) as described above. In one example embodiment, the processor 250 determines the plurality of frames, as follows.

Assuming a capturing period (integration period) of T seconds (or minutes), let $\{X^t\}_{t=1}^P$ represent each high speed frame of the original high speed motion scene 130 (assuming that P high speed frames are to be reconstructed, as described in example embodiments above). Each $X^t$ has a spatial dimension of $N_x \times N_y$. Accordingly, each frame $X^t$ has $N_x$ pixels for each row and $N_y$ pixels for each column.

Furthermore, each rotated version of the mask 110 (e.g., rotated at fixed 30 or 10 degrees angles) may be represented by $\{M^t\}_{t=1}^P \in R^{N_x \times N_y}$. Each $M^t$ may also be referred to as a filter. Each $M^t$ has the same spatial dimension as each high speed frame $X^t$.

In one example embodiment, the processor 250 transforms the captured scene 130 (at the relatively low rate of frames per second) to a matrix/vector of pixel values (first matrix/vector of pixel values). Let Y denote the captured scene 130 by the motion capturing device 100. Y may be represented as:

$$Y = \sum_{t=1}^P X^t \odot M^t + N \quad (1)$$

where $\odot$ denotes an element-wise (Hadamard) product of frame $X^t$ and $M^t$ and N denotes measurement noise. Accordingly, for each pixel $y(i,j)$ of the captured scene Y with $i=1, 2, \ldots, N_x$ and $j=1, 2, \ldots, N_y$, $y(i,j)$ is given by:

$$y(i,j) = \sum_{t=1}^P x(i,j)^t m(i,j)^t + n(i,j) \quad (2)$$

where $y(i,j)$, $x(i,j)$, $m(i,j)$ and $n(i,j)$ denote the $(i,j)^{th}$ pixel of Y, $X^t$, $M^t$ and N, respectively.

In order to determine $x(i,j)^t$ for $t=1, \ldots, P$, equation (2) may be rewritten as:

$$y = \Phi x + n \quad (3)$$

with $$\Phi = [\text{Diag}(m^1), \text{Diag}(m^2), \ldots, \text{Diag}(m^T)] \in R^{N_x N_y \times N_x N_y P} \quad (4)$$

where $\text{Diag}(m^t)$ is a diagonal matrix with diagonal elements composed of entries of the vector $m^t$, and x and $m^t$ are respectively given by equations (5) and (6) below:

$$x = \begin{bmatrix} x_1^1 \\ \vdots \\ x_{N_x \times N_y}^1 \\ x_1^2 \\ \vdots \\ x_{N_x \times N_y}^2 \\ \vdots \\ x_1^T \\ \vdots \\ x_{N_x \times N_y}^T \end{bmatrix} \in R^{N_x N_y P} \quad (5)$$

and $$m^t = [m_1^t, m_2^t, \ldots, m_{N_x \times N_y}^t]^T \text{ for } t = 1, \ldots, P \quad (6)$$

In one example embodiment, for each pixel value $y(i,j)$ in the first matrix/vector of pixel values, the processor 250 determines a second matrix/vector of pixel values that minimizes a difference between the pixel value in the first matrix/vector of pixel values and a product (e.g., an element-wise product) of the second matrix/vector of pixel values and a corresponding one of a plurality of filters (e.g., $\{M^t\}_{t=1}^P$). In one example embodiment, the second matrix/vector of pixel values corresponds to one of the plurality of high speed frames. This process of determining the second matrix/vector of pixel values may be performed as follows.

Given y and Φ as described above, each high speed frame x may be determined by solving the following equation (7):

$$x = \arg\min_x \tfrac{1}{2}\|y-\Phi x\|_2^2 + \tau R(x) \tag{7}$$

where R(x) is a regularization term (which may be a reconfigurable term/parameter determined based on experiments and/or empirical studies) and τ is a constant (which may be a reconfigurable parameter determined based on experiments and/or empirical studies) for balancing the two terms on the right hand side of equation (7).

In one example embodiment, any known or to be developed algorithm may be used to solve equation (7) including, but not limited to, algorithms provided in "Low-cost compressive sensing for color video and depth" by Xin Yuan et al. (published in IEEE Conference on Computer Vision and Pattern Recognition in 2014), "Video compressive sensing using Gaussian mixture models," by J. Yang et al. (published in IEEE Transaction on Image Processing, vol. 23, no. 11, pp. 4863-4878, November 2014), "Generalized alternating projection based total variation minimization for compressive sensing," by Xin. Yuan et al. (published in International Conference on Image processing, 2016), the entire contents of which are hereby incorporated by reference.

While a reference is provided above to one or more specific algorithms for obtaining a solution to equation (7), example embodiments are not limited thereto and instead any known or to be developed algorithm may be used for obtaining a solution to equation (7).

At S316 and upon determining the plurality of high speed frames of the high speed motion scene 130, the processor 250 reconstructs the high speed motion scene 130 based thereon. In one example embodiment, the processor 250 reconstructs the high speed motion scene 130 by adding the plurality of high speed frames to obtain the original high speed motion scene 130.

In one example embodiment, when the motion capturing device 100 captures a high speed motion scene 130 (e.g., a fast moving car racing scene) at relatively low rate of frames per second (e.g., 30 fps) for 10 seconds, the captured scene may be blurry and of low quality due to the low rate of frames per second. However, example embodiments above enable the fast moving car racing scene to be reconstructed from that captured by the motion capturing device 100 at low frame rate, such that the reconstructed fast moving car racing scene is of sufficient quality comparable to the original fast moving car racing scene as would be observed by a spectator using naked eyes.

Thereafter, at S321, the processor 250 may provide the reconstructed high speed motion scene for further utilization by another device and or another local application (e.g., another local application on the UE 200), as described above.

In example embodiments described above with reference to FIG. 3, the processes at S306, S311 and S316 are performed by the processor 250 at the UE 200 or a processor of the motion capturing device 100. In one example embodiment, the processes at S306, S311 and S316 may be performed remotely (e.g. on a cloud). For example, the motion capturing device 100, upon capturing the scene 130 at S301, may send the captured scene 130 to a remote processor (e.g., on the cloud), where the remotely located processor received the captured scene at S306 and carries out the processing at S311 and S316. Thereafter, the remotely located processor transmits back the reconstructed high speed frames to the processor 250 of the UE 200 or the processor of the motion capturing device 100 in order to carrying out the process at S321. In one example embodiment, the communication between the motion capturing device 100 (a processor thereof)/processor 250 and the remotely located processor may be via any known or to be developed wired and/or wireless communication means (e.g., via the wireless communication interfaces 290 and the antenna 295 of the UE 200 as shown in FIG. 2).

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

I claim:

1. A motion capturing device comprising:
   a mask configured to rotate during capture of a scene by the motion capturing device and modulate the scene; and
   a motor coupled to the mask and configured to rotate the mask during the capturing of the scene,
   wherein the mask is coded with a random pattern.

2. The motion capturing device of claim 1, wherein the motor is configured to rotate the mask such that the mask completes one revolution every time a frame of the scene is captured by the motion capturing device.

3. The motion capturing device of claim 2, wherein the motor is configured to rotate the mask for a number of times every time a frame of the scene is captured by the motion capturing device, each time the motor is configured to rotate the mask for a fixed degree of rotation.

4. The motion capturing device of claim 3, wherein the fixed degree of rotation is based on a number of high speed frames of the scene to be reconstructed from the modulated scene.

5. The motion capturing device of claim 4, wherein the fixed degree of rotation is given by 360 degrees divided by the number of high speed frames.

6. The motion capturing device of claim 3, wherein
   the scene is a high speed motion scene, and
   the motion capturing device is configured to capture the scene at a rate of frames per unit of time that is lower relative to the high speed motion of the scene.

7. The motion capturing device of claim 1, wherein the random pattern is a binary pattern that either allows for a transmission of light or a blocking thereof.

8. The motion capturing device of claim 1, wherein the random pattern is a grayscale pattern according to which light is transmitted in proportion to a local transmittance ratio of the mask.

9. The motion age capturing device of claim 1, wherein the rotation of the mask is an angular rotation about a central axis passing through components of the motion capturing device.

10. The motion capturing device of claim 1, wherein during the capture of the scene, the mask does not shift vertically or horizontally.

11. The motion capturing device of claim 1, wherein the motor is a vibrating motor.

12. The motion capturing device of claim 1, further comprising:
   a lens configured to project light on to the scene;
   a relay lens; and
   a charge-coupled device, wherein
   the mask is between the lens and the relay lens.

13. The motion capturing device of claim 1, further comprising:
a lens configured to project light on to the scene;
a relay lens; and
a charge-coupled device, wherein
the mask is between the relay lens and the charge-coupled device.

14. An electronic mobile device, comprising:
a display; and
the motion capturing device of claim 1, the motion capturing device configured to be controlled via the display.

15. A device comprising:
a memory having computer-readable instructions stored therein; and
a processor configured to execute the computer-readable instructions to,
control a motion capturing device to capture a scene,
receive the captured scene,
obtain a plurality of frames corresponding to the scene based on the captured scene and a plurality of filters, each of the plurality of filters corresponding to a rotated version of a mask in the motion capturing device, the mask being configured to rotate during the capturing of the scene, and
reconstruct the scene based on the plurality of frames, wherein the mask is coded with a random pattern.

16. The device of claim 15, wherein the scene is a high speed motion scene formed of the plurality of frames.

17. The device of claim 16, wherein the motion capturing device is configured to capture the scene at a lower rate of frames per unit of time relative to the high speed motion of the scene.

18. The device of claim 15, wherein the processor is configured to execute the computer-readable instructions to obtain each of the plurality of frames by,
transforming the received captured scene into a first vector of pixel values, and
for each pixel value, determine a second vector of pixel values that minimizes a difference between the pixel value and a product of the second vector of pixel values and a corresponding one of the plurality of filters, the second vector of pixel values corresponding to one of the plurality of frames.

19. The device of claim 18, wherein the product is an element-wise product of the second vector of pixel values and the corresponding one of the plurality of filters.

* * * * *